(12) United States Patent
Reineke et al.

(10) Patent No.: US 10,639,838 B2
(45) Date of Patent: May 5, 2020

(54) HOSE EXTRUSION HEAD AND METHOD FOR PRODUCING A HOSE

(71) Applicant: KRAUSSMAFFEI BERSTORFF GMBH, Hannover (DE)

(72) Inventors: Frank Reineke, Ronnenberg (DE); Harald Hepke, Hannover (DE)

(73) Assignee: KRAUSSMAFFEI BERSTORFF GMBH, Hannover (DE)

(*) Notice: Subject to any disclaimer, the term of this patent is extended or adjusted under 35 U.S.C. 154(b) by 734 days.

(21) Appl. No.: 15/120,957

(22) PCT Filed: Feb. 25, 2015

(86) PCT No.: PCT/EP2015/053878
§ 371 (c)(1),
(2) Date: Aug. 23, 2016

(87) PCT Pub. No.: WO2015/135750
PCT Pub. Date: Sep. 17, 2015

(65) Prior Publication Data
US 2016/0361857 A1    Dec. 15, 2016

(30) Foreign Application Priority Data

Mar. 14, 2014 (DE) .................. 10 2014 103 521

(51) Int. Cl.
*B29C 48/325* (2019.01)
*B29C 48/30* (2019.01)
(Continued)

(52) U.S. Cl.
CPC .............. *B29C 48/30* (2019.02); *B29C 48/09* (2019.02); *B29C 48/10* (2019.02); *B29C 48/302* (2019.02);
(Continued)

(58) Field of Classification Search
CPC ......... B29C 48/09; B29C 48/10; B29C 48/30; B29C 48/302; B29C 48/325;
(Continued)

(56) References Cited

U.S. PATENT DOCUMENTS

| 2,859,476 | A |   | 11/1958 | Lainson |           |
|-----------|---|---|---------|---------|-----------|
| 4,946,364 | A | * | 8/1990  | Wagner  | B29C 48/30 |
|           |   |   |         |         | 425/72.1  |
| 5,110,518 | A | * | 5/1992  | Halter  | B29C 48/30 |
|           |   |   |         |         | 264/40.1  |
| 5,120,212 | A | * | 6/1992  | Reiber  | B29C 48/30 |
|           |   |   |         |         | 425/141   |

(Continued)

FOREIGN PATENT DOCUMENTS

DE       25 42 331     9/1976
DE    10 2008 061 286  6/2010
(Continued)

OTHER PUBLICATIONS

International Search Report issued by the European Patent Office in International Application PCT/EP2015/053878.

*Primary Examiner* — Xiao S Zhao
*Assistant Examiner* — Joseph S Leyson
(74) *Attorney, Agent, or Firm* — Henry M. Feiereisen LLC

(57) ABSTRACT

The invention relates to a hose extrusion head for producing a hose (50), said head comprising a head housing, a duct (14) formed in the head housing (12) for supplying a hose material (22), a pin (16) which is arranged in the duct (14), a die (18) and at least one securing element (20). According to the invention, the securing element (20) is attached by one end (39) to the die (18) such that said end (39) follows the movement of the die (18).

17 Claims, 2 Drawing Sheets

(51) Int. Cl.
*B29C 48/10* (2019.01)
*B29C 48/92* (2019.01)
*B29C 48/09* (2019.01)

(52) U.S. Cl.
CPC .......... *B29C 48/325* (2019.02); *B29C 48/327* (2019.02); *B29C 48/92* (2019.02); *B29C 2948/92152* (2019.02); *B29C 2948/92447* (2019.02); *B29C 2948/92647* (2019.02); *B29C 2948/92904* (2019.02)

(58) Field of Classification Search
CPC .................. B29C 48/327; B29C 48/92; B29C 2948/92152; B29C 2948/92447; B29C 2948/92647; B29C 2948/92904
See application file for complete search history.

(56) References Cited

U.S. PATENT DOCUMENTS 5,776,519 A * 7/1998 Flammer ................. B29C 48/30
425/188
2013/0302548 A1* 11/2013 Nadeau ................. A61M 39/08
428/36.9

FOREIGN PATENT DOCUMENTS

| EP | 0 075 809 | 4/1983 |
| JP | 58-67419 | 4/1983 |
| JP | 3-66722 | 6/1991 |
| JP | 3-216324 | 9/1991 |
| JP | 4-31026 | 2/1992 |

* cited by examiner

HOSE EXTRUSION HEAD AND METHOD FOR PRODUCING A HOSE

CROSS-REFERENCES TO RELATED APPLICATIONS

This application is the U.S. National Stage of International Application No. PCT/EP2015/053878, filed Feb. 25, 2015, which designated the United States, and has been published as International Publication No. WO 2015/135750 and which claims the priority of German Patent Application, Serial No. 10 2014 103 521.6, filed Mar. 14, 2014, pursuant to 35 U.S.C. 119(a)-(d).

BACKGROUND OF THE INVENTION

The invention relates to a hose extrusion head for producing a hose, comprising (a) a head housing, (b) a duct formed in the head housing, for supplying a hose material, (c) a pin which is arranged in the duct, (d) a die which lies in a contact surface on the head housing, and (e) at least one securing element, by means of which the die is attached to the head housing. Under a second aspect, the invention relates to a method for producing a hose.

Such hose extrusion heads are used in systems for hose production and form the hose from the hose material. It is essential in the manufacture of hoses that a predetermined nominal wall thickness of the hose is not fallen below. Otherwise, the stability of the hose according to specification would not be achieved. So as to have to use as little hose material as possible for the production of a hose, the hose should have as small a wall thickness as possible around its entire circumference. Ideally, the hose therefore has exactly the nominal wall thickness around its entire circumference. However, this assumes that the die, which forms the outer wall of the resulting hose, is centred perfectly to the pin which forms the inner wall of the resulting hose. This is able to be achieved only with difficulty with hose extrusion heads hitherto.

From DE 10 2008 061 286 A1 a hose extrusion head with a centring device is known, by means of which the die and the pin can be centred relative to one another. For this, the pin is changed in its position. A disadvantage in this system is that it is technically relatively complex. A further disadvantage in the known system is that it can only be used for transverse hose extrusion heads. In other words, the hose material must be deflected about an angle of generally 90° so that the centring device for the pin can be actuated from the exterior.

The invention is based on the problem of producing, in a simple manner, a hose having a homogeneous wall thickness.

SUMMARY OF THE INVENTION

The invention solves the problem by a generic hose extrusion head, in which the securing element is attached by one end to the die such that the end follows a movement of the die. An extruder with a hose extrusion head according to the invention is in addition in accordance with the invention.

It is advantageous here that a radial movement of the die relative to the head housing leads only to a little friction between the securing element and the die. In operation of the hose extrusion head, therefore when the hose extrusion head is acted upon with hose material, a relatively small force is thus necessary in order to move the die relative to the head housing.

In known hose extrusion heads, the die is arranged so that the securing element lies in a clamping surface against the die and exerts, via the clamping surface, a force onto the die and thus presses it onto the head housing. In order to move the die relative to this clamping surface and in addition relative to a contact surface to the head housing, an overall frictional force must be overcome, which is the sum of the frictional forces on the contact surface and on the clamping surface.

In the operation of the extruder on which the hose extrusion head is attached, the very high mass forces of the hose material in known systems in fact lead to a decrease in the frictional force on the contact surface, but to an increase in the frictional force on the clamping surface. Altogether, therefore, a great overall frictional force had to be overcome. In so doing, a stick-slip effect occurs, which distinctly restricts the accuracy which is able to be achieved in the centring of the die relative to the pin.

Through the fact that the securing element is attached by one end to the die such that the end follows a movement of the die, the frictional force on the clamping surface is always small. In operation of the hose extrusion head, in addition the frictional force decreases between the die and the head housing. Therefore, during operation of the hose extrusion head only a small overall frictional force has to be overcome, in order to centre the die. Thus, the die can be centred very accurately. This, in turn, allows the safety allowance to be reduced which is necessary in order to ensure that the nominal wall thickness is not fallen below. The safety allowance is the difference between the nominal wall thickness and the set wall thickness, which must be selected to be sufficiently great in order to prevent the nominal wall thickness being fallen below under unfavourable production conditions. The reduction of the safety allowance which is possible through the invention leads to a smaller consumption of hose material. It is possible that in addition to the securing element, a further securing device is present, by means of which the die is also attached to the head housing. In other words, the securing element alone can attach the die to the head housing, but that is not necessary.

Within the scope of the present description, the head housing is understood to mean the component in which the duct is formed. The head housing could also be designated as the base body. The head housing receives the mass forces, acting radially outwards, which are exerted by the hose material. During operation of the hose extrusion head, the hose material is under a pressure of typically up to 5 Megapascal.

The pin is understood in particular to mean the component which forms the inner wall of the resulting hose. Generally, the pin, as provided in a preferred embodiment, is circular in cross-section, i.e. cylindrical or cone-shaped at least in some portions. Basically, however, the invention is also suitable for pins which do not have a circular cross-section.

The die is understood to mean in particular the component of the hose extrusion head which forms the outer wall of the resulting hose. It is possible, but generally superfluous as provided according to a preferred embodiment, that a further forming device is arranged behind the die, which further forms the outer contour of the hose.

The frictional force between the die and the head housing is understood to mean in particular the static frictional force which prevents a travel motion of the die relative to the head housing. In other words, the frictional force is in particular the static frictional force which counteracts a travel motion of the die relative to the head housing and must be overcome for moving the die. The travel motion is the movement which brings a die from an uncentred position into a centred position.

Preferably the securing element has an end by which it is attached to the die, and at least a second end by which it is attached relative to the head housing. In particular, the securing element transmits a tensile force between the first and the second end. The securing element can therefore also be designated as a tension element. For example, the securing element is attached to the die in a die attachment point, wherein the attachment point is to be understood not as a point in the mathematical sense, but rather a region which is small compared to an end face of the die, in particular smaller than one fifth.

According to a preferred embodiment, the die lies in a contact surface against the head housing, and the securing element clamps the die toward the contact surface. It is possible here that the securing element exerts a compressive force onto the die and presses the latter against the contact surface. This compressive force is directed contrary to the mass force during operation of the hose extrusion head.

The contact surface is understood to mean in particular the surface which is formed between the die and the head housing and is oriented so that the frictional force between the contact surface and the head housing is reduced by the mass force which acts during operation of the extruder, on which the hose extrusion head is attached. In other words, only those surface portions in which the die and the head housing are in contact with one another are counted as the contact surface, in which the mass force would increase a distance to the head housing if the die were movable and were not attached by the securing element.

Preferably, the securing element is configured for drawing the die to the head housing. In this case, the securing element can also be designated as traction element. Of course, a point can also arise in a traction element, at which a compressive force is transmitted. However, it is important that the securing element is configured so that it can be formed by a device which can transmit only tractive forces, for example a cable or a chain. In other words, the feature that the securing element draws the die to the head housing is understood to mean that the securing element is configured so that it could be replaced by a pure tractive element, therefore a component which can not transmit any compressive forces. For example, the securing element is a bolt, a rod, a chain or a cable, in particular a wire cable.

It is advantageous in such a securing element that with a small movement of the die relative to the base body in good approximation no friction occurs between the die and the securing element. Between the securing element and the die therefore no, or only an insignificantly small friction occurs, so that at the most an insignificantly small frictional force has to be overcome between die and securing element, in order to move the die relative to the housing head. Of course, if applicable a frictional force remains between the die and the head housing itself, but decreases through the action of the mass force, so that it is also easy to overcome. This has the advantages described above during centring of the die.

Preferably, the securing element is arranged so that a mass force which is exerted from the hose material onto the die in the use of the hose extrusion head reduces a frictional force between the die and the head housing.

According to a preferred embodiment, the securing element is fixed relative to the head housing in a head housing attachment point and is attached to the die in a die attachment point. Here, the head housing attachment point is arranged upstream to the die attachment point with respect to an inflow path of the hose material. In operation, this leads to the mass forces which the hose material exerts on the die, counteracting the force which the securing element exerts on the die. Therefore, the greater the mass force, the smaller the force becomes with which the die and the head housing can rub against one another. This leads to the easy adjustability described above.

Preferably, the die comprises a die insert holder and a die insert, wherein the die insert holder has an axial adjusting device for adjusting an axial position of the die insert relative to the die insert holder. The axial position is understood here to mean in particular the position in relation to the longitudinal axis of the pin. The pin is preferably conical at least on its side facing the die insert, so that by the changing of the axial position of the die insert, an internal diameter of the resulting hose is able to be changed. Such a hose extrusion head permits the sensitive setting of the wall thickness and in addition a centring. Thus, very small consumptions of material can be achieved in the manufacture of hoses. Alternatively, the die is formed in one piece.

According to a preferred embodiment, the hose extrusion head comprises a positioning device for changing a position of the die relative to the pin, so that the die is able to be centred relative to the pin. This can be here a manually operable positioning device or, as provided according to a preferred embodiment, an automatically operable positioning device. For example, the positioning device comprises a drive, for example in the form of an electric motor or a hydraulic cylinder. The electric motor and/or the hydraulic cylinder can cooperate with a ball screw, in order to enable the movement of the die relative to the head housing. It is also possible that the positioning device comprises a piezo drive.

It is favourable, although not necessary, that the positioning device has antagonistic drives. For example, it is advantageous if the positioning device has at least two pairs of piezo drives lying opposite one another, which can move the die in opposite directions. In this way, the drives can always move the die by applying a compressive force.

Preferably, the hose extrusion head comprises a position regulation, which comprises the positioning device, which has at least one drive for the automatic changing of the position of the die, and a wall thickness measuring device for measuring a wall thickness of the hose, wherein the position regulation is arranged for the automatic changing of the position of the die, so that a predetermined nominal wall thickness is not fallen below and an overall deviation of the wall thickness from the predetermined nominal wall thickness becomes minimal. The wall thickness measuring device can comprise for example an X-ray device, by means of which the wall thickness is able to be measured by the weakening of the X-rays.

Preferably, the hose extrusion head has a seal which is arranged between the die and the head housing. In this way, a penetration of hose material into the region of the contact surface is prevented.

In addition in accordance with the invention is a hose production device for producing a hose, which comprises an extruder for delivering hose material, in particular rubber, and a hose extrusion head according to the invention, wherein the hose extrusion head is connected to the extruder so that in operation the extruder delivers the hose material into the duct.

In addition in accordance with the invention is a method for producing a hose with the steps: (i) delivering hose material into the duct of a hose extrusion head according to the invention, so that the hose material flows along the pin, (ii) measuring a wall thickness of the hose and (iii) automatic changing of the position of the die, so that a predetermined nominal wall thickness is not fallen below and an overall deviation of the wall thickness from the predetermined nominal wall thickness becomes minimal.

BRIEF DESCRIPTION OF THE DRAWING

The invention is explained in further detail below with the aid of the enclosed drawings. There are shown.

DETAILED DESCRIPTION OF PREFERRED EMBODIMENTS

Figure 1:
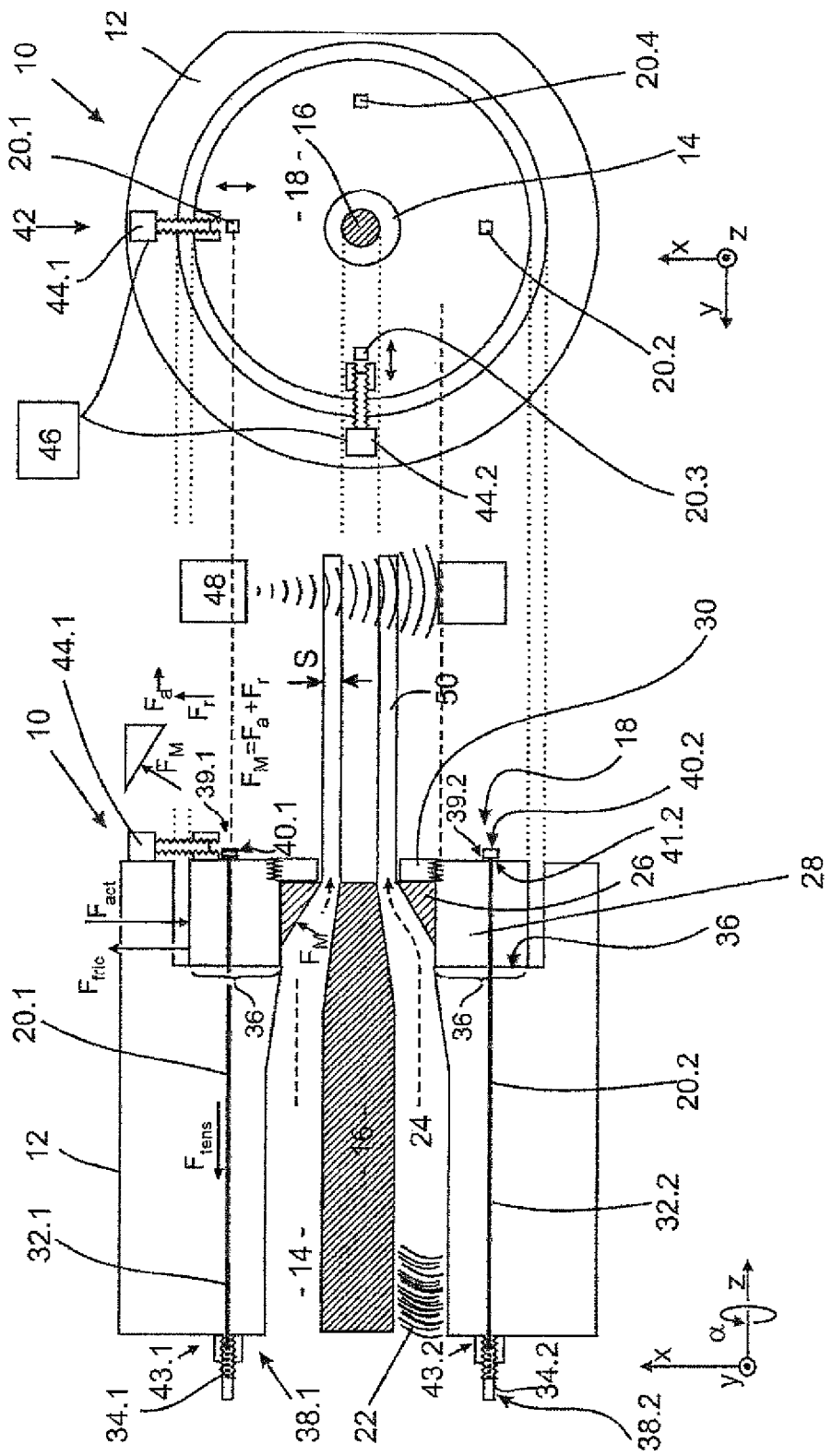
FIG. 1 a hose extrusion head according to the invention in a cross-section and in a longitudinal section, FIG. 2 the cross-section of the hose extrusion head according to FIG. 1, after the die was decentred and FIG. 3 the hose extrusion head according to the preceding figures after actuation of an axial adjusting device.

FIG. 1 shows a hose extrusion head 10 according to the invention, with a head housing 12, in which a duct 14 is formed. In the duct 14 there is situated a pin 16, which is rigidly connected to the head housing 12 in a detachable manner. A hatching serves to illustrate an object and is not necessarily to be regarded as an indication of a section.

The hose extrusion head 10 has in addition a die 18 which is attached to the head housing 12 via securing elements 20. In FIG. 1 the securing elements 20.1, 20.2, 20.3 and 20.4 are drawn (reference numbers without numerical suffix refer respectively to all corresponding objects). The number of the securing elements is, however, able to be freely selected in wide limits.

In operation, the duct 14 is filled with hose material 22. The hose material 22 is usually rubber. The hose material 22 flows along an inflow path 24, which is indicated by arrows, toward the die 18.

In the present embodiment, the die 18 comprises a die insert 26 and a die insert holder 28. The die insert holder 28 has an axial adjusting device 30. In the embodiment shown in FIG. 1, the axial adjusting device 30 is formed by a ring with an external thread, which meshes with the die insert holder 28. By turning the ring about its longitudinal axis (in the present case about the z-axis), the axial position of the die insert 26 relative to the die insert holder 28 can be altered. The axial position is the height with respect to the z-axis which corresponds to a longitudinal axis of the pin 16. According to an alternative embodiment, the die 18 can be embodied in one piece.

The securing element 20 comprises tensioning elements, in the present case tensioning wire cables 32, of which the tensioning wire cables 32.1, 32.2 are shown. The tensioning wire cables 32 are pre-tensioned by tensioning devices 34 so that they transmit a tension force $F_{tens}$ onto the die 18.

The die 18 lies in a contact surface 36 against the head housing 12. When a travel motion occurs, therefore a movement in the x-y plane, an actuating force $F_{act}$, which is greater than a frictional force $F_{fric}$, must be applied for this onto the die 18.

As is shown diagrammatically, the hose material 22 exerts a mass force $F_M$ on the die 18. The term "mass force" is selected here because the hose material, which can also be designated as the mass to be processed, exerts this force. The term "mass force" is not to be understood to the effect that it comes about primarily through the inertia of deflected masses. In the figures, the forces are recorded without a vector arrow, for the sake of simplicity. Of course, the forces are all vectorial quantities.

As is shown diagrammatically, the mass force $F_M$ can be broken down vectorially into an axially acting force $F_a$ and a radially acting force $F_r$. The axial portion $F_a$ counteracts the tension force $F_{tens}$. That means that a vector addition of the tension force $F_{tens}$ and of the axial portion $F_a$ of the mass force $F_M$ has a smaller amount than the tension force $F_{tens}$. The die 18 exerts on the contact surface P a surface pressing $p_{36}$, which can also be understood as pressure. Through the action of the mass force $F_M$, the surface pressing $p_{36}$ reduces. Thereby, the frictional force $F_{fric}$ decreases with increasing mass force $F_M$.

The securing elements 20 have respectively a head housing attachment point 38 and a die attachment point 40. Each securing element 20 has a first end 39, by which it is attached to the die 18 in the respective die attachment point 40. The securing element 20 lies with a clamping surface 41 against the die 18. The head housing attachment point 38 is formed at a second end 43 of the securing element 20.

The die attachment point 40 is arranged downstream relative to the head housing attachment point 38, which means that the hose material 22 firstly flows past in the vicinity of the head housing attachment point and thereafter in the vicinity of the die attachment point. In this way, the action of the mass force $F_M$ described above comes about in relation to the tension force $F_{tens}$.

In the right-hand partial image, it is shown that that the hose extrusion head 10 comprises a positioning device 42. In the present embodiment, the positioning device 42 comprises two drives 44.1, 44.2, which comprise respectively a ball screw and a motor for driving the ball screw. By actuating the drives 44.1, 44.2, the die 18 can be centred relative to the pin 16.

The drives 44 are connected by diagrammatically drawn cables with a position regulation 46. The position regulation 46 is, in addition, in connection with a wall thickness measuring device 48, by means of which a wall thickness S of a hose 50 which is to be manufactured is measured. The position regulation 46 detects continuously whether the wall thickness S corresponds to a nominal wall thickness. If a deviation is detected, the position regulation 46 actuates the drives 44 so that any decentring is remedied or at least reduced. In addition, it is possible that the hose extrusion head 10 has an automatic axial adjusting device, which is likewise connected with the position regulation 46.

Figure 2:
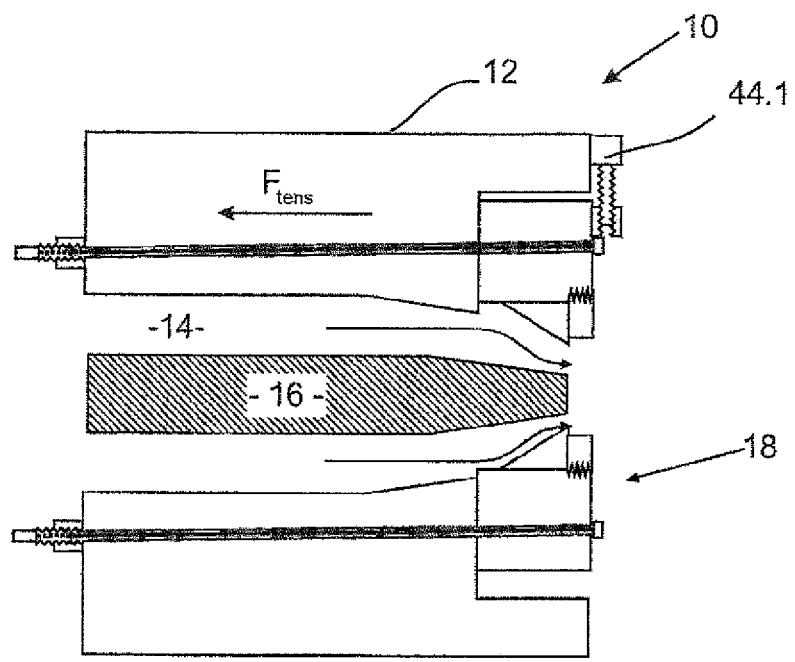

FIG. 2 shows the case in which the die 18 has been moved relative to the head housing 12 by actuating of the drive 44.1. It can be seen that the die 18 is now arranged in an uncentred manner relative to the pin 16.

Figure 3:
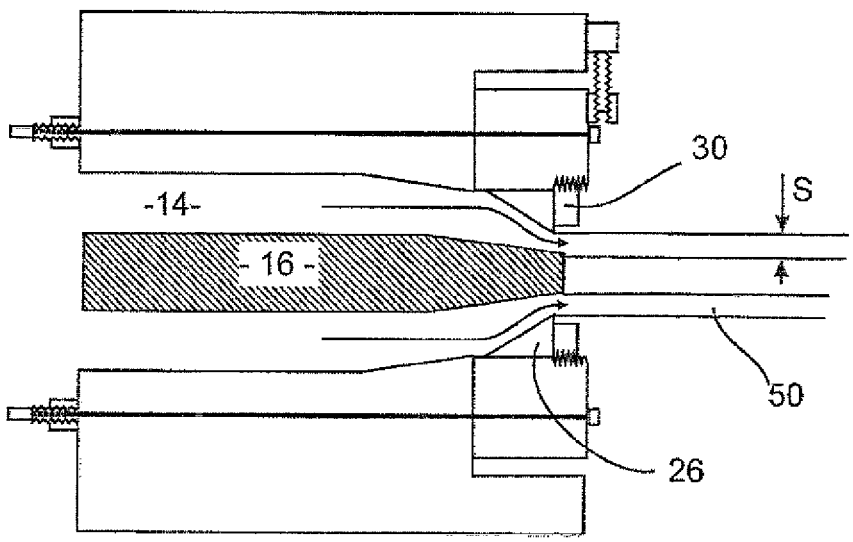

FIG. 3 shows the effect of an adjustment of the axial adjusting device 30. It can be seen that the die insert 26 has been moved further towards the pin 16. As the pin 16 is constructed conically at its end facing the die 18, through this movement the wall thickness S of the hose 50 reduces. The hose extrusion head 10 according to the invention therefore makes it possible to adjust both the wall thickness S and also the wall thickness differences by centring the die 18.

The invention claimed is:

1. A hose extrusion head for producing a hose, said hose extrusion head, comprising:
   a head housing;
   a duct formed in the head housing for supplying a hose material;
   a phi arranged in the duct;
   a die movable relative to the pin for centering; and
   at least one securing element configured to attach the die to the head housing, said securing element having one end attached to the die such that the end follows a movement of the die,
   wherein the at least one securing element is a pre-tensioned wire cable.

2. The hose extrusion head of claim 1, wherein the die lies against the head housing at a contact surface, said securing element being configured to clamp the die toward the contact surface.

3. The hose extrusion head of claim 1, wherein the securing element is arranged such that a mass force, which is exerted by the hose material in an operating state of the hose extrusion head on the die, reduces a frictional force between the die and the head housing.

4. The hose extrusion head of claim 1, wherein the securing element is fixed in a head housing attachment point relative to the head housing and attached to the die in a die attachment point, said head housing attachment point being arranged upstream to the die attachment point with respect to an inflow path of the hose material.

5. The hose extrusion head of claim 1, wherein the die comprises a die insert, and a die insert holder including an axial adjusting device having an axial adjusting device for adjusting an axial position of the die insert relative to the die insert holder.

6. The hose extrusion head of claim 1, further comprising a positioning device configured to alter a position of the die relative to the pin so as to enable centering of the die relative to the pin.

7. The hose extrusion head of claim 6, wherein the positioning device is a part of a position regulation and includes at least one drive for automatically changing the position of the die, said position regulation further including a wall thickness measuring device for measuring a wall thickness of the hose, said wall thickness measuring device being configured for automatically changing the position of the die so as to prevent the wall thickness of the hose to fall below a predetermined nominal wall thickness and to minimize an overall deviation of the wall thickness from the predetermined nominal wall thickness.

8. The hose extrusion head of claim 1, further comprising a seal arranged between the die and the head housing.

9. A hose production device for producing a hose, said hose production device comprising:
   an extruder for delivering hose material; and
   a hose extrusion head comprising a head housing, a duct formed in the head housing for supplying a hose material, a pin arranged in the duct, a die movable relative to the pin for centering, and at least one securing element configured to attach the die to the head housing and having one end attached to the die such that the end follows a movement of the die,
   said hose extrusion head being connected with the extruder so that, in operation, the extruder delivers the hose material into the duct,
   wherein the at least one securing element is a pre-tensioned wire cable.

10. The hose production device of claim 9, wherein the die lies against the head housing at a contact surface, said securing element being configured to clamp the die toward the contact surface.

11. The hose production device of claim 9, wherein the securing element is arranged such that a mass force, which is exerted by the hose material in an operating state of the hose production device on the die, reduces a frictional force between the die and the head housing.

12. The hose production device of claim 9, wherein the securing element is fixed in a head housing attachment point relative to the head housing and attached to the die in a die attachment point, said head housing attachment point being arranged upstream to the die attachment point with respect to an inflow path of the hose material.

13. The hose production device of claim 9, wherein the die comprises a die insert, and a die insert holder including an axial adjusting device having an axial adjusting device for adjusting an axial position of the die insert relative to the die insert holder.

14. The hose production device of claim 9, wherein the hose extrusion head includes a positioning device configured to alter a position of the die relative to the pin so as to enable centering of the die relative to the pin.

15. The hose production device of claim 14, wherein the positioning device is a part of a position regulation and includes at least one drive for automatically changing the position of the die, said position regulation further including a wall thickness measuring device for measuring a wall thickness of the hose, said wall thickness measuring device being configured for automatically changing the position of the die so as to prevent the wall thickness of the hose to fail below a predetermined nominal wall thickness and to minimize an overall deviation of the wall thickness from the predetermined nominal wall thickness.

16. The hose production device of claim 9, wherein the hose extrusion head includes a seal arranged between the die and the head housing.

17. The hose production device of claim 9, wherein the hose material is rubber.

* * * * *

UNITED STATES PATENT AND TRADEMARK OFFICE
CERTIFICATE OF CORRECTION

PATENT NO. : 10,639,838 B2
APPLICATION NO. : 15/120957
DATED : May 5, 2020
INVENTOR(S) : Frank Reineke and Harald Hepke Page 1 of 1

It is certified that error appears in the above-identified patent and that said Letters Patent is hereby corrected as shown below:

In the Claims

In Column 7, Claim 1, Line 7: replace "phi" with --pin--.

In Column 8, Claim 15, Line 45: replace "fail" with --fall--.

Signed and Sealed this
Twelfth Day of January, 2021

Andrei Iancu
*Director of the United States Patent and Trademark Office*